US006230871B1

(12) United States Patent
Balzer-Apke et al.

(10) Patent No.: US 6,230,871 B1
(45) Date of Patent: May 15, 2001

(54) SAFETY DEVICE FOR ESCALATORS AND MOVING PAVEMENTS

(75) Inventors: Ludwig Balzer-Apke, Velbert; Andreas Tautz, Waltrop; Dirk Lange, Dortmund, all of (DE)

(73) Assignee: Kone Corporation, Helsinki (FI)

( * ) Notice: Subject to any disclaimer, the term of this patent is extended or adjusted under 35 U.S.C. 154(b) by 0 days.

(21) Appl. No.: 09/586,755

(22) Filed: Jun. 5, 2000

Related U.S. Application Data

(63) Continuation of application No. PCT/EP98/06422, filed on Oct. 9, 1998.

(30) Foreign Application Priority Data

Dec. 4, 1997 (DE) ............................................. 197 54 141

(51) Int. Cl.[7] ............................ B65G 43/00; B66B 25/00
(52) U.S. Cl. ......................................... 198/323; 198/810.9
(58) Field of Search ................................ 198/323, 464.4, 198/502.1, 810.01–810.04

(56) References Cited

U.S. PATENT DOCUMENTS 4,326,606 4/1982 Kuzunuki et al. .
5,083,653 * 1/1992 Sakata et al. ........................ 198/323
5,526,256 6/1996 Sakata et al. .

FOREIGN PATENT DOCUMENTS 01281287 11/1989 (JP) .

* cited by examiner

*Primary Examiner*—Joseph E. Valenza
(74) *Attorney, Agent, or Firm*—Venable; Robert Kinberg

(57) ABSTRACT

The invention relates to a device for monitoring functional units on escalators and moving walkways, comprising several processors which monitor predetermined parameters of a particular functional unit independently of each other. The processors are connected to devices for immediately shutting down the escalator or moving walkway and interact with at least one other processor which is provided for controlling and/or diagnosing functions which are not relevant to safety.

8 Claims, 4 Drawing Sheets

SAFETY DEVICE FOR ESCALATORS AND MOVING PAVEMENTS

Figure 1:
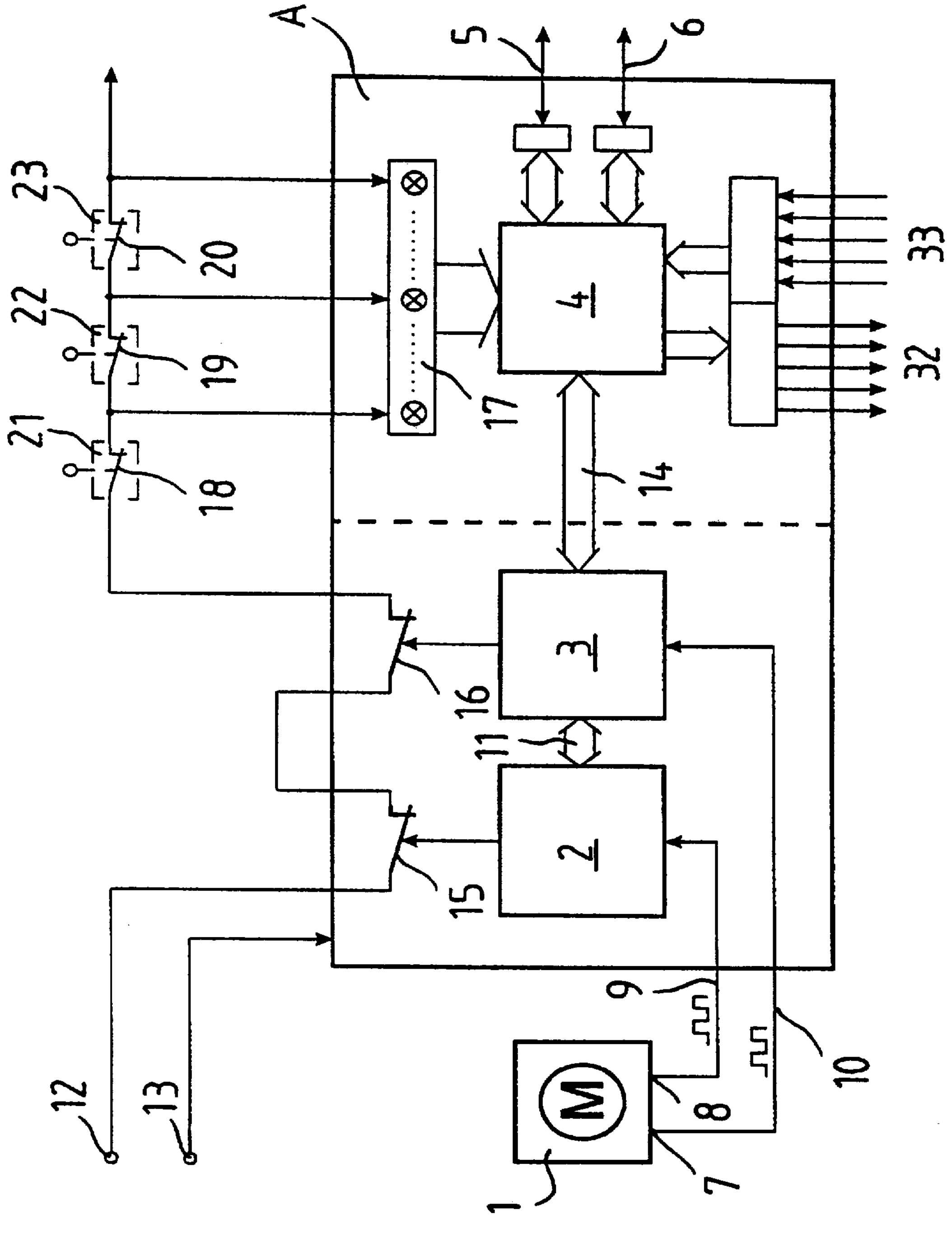

This application is a continuation of PCT/EP98/06422, with an international filing date of Oct. 9, 1998.

The invention relates to a device for monitoring functional units at escalators and moving pavements consisting of several processors being independent from each other and controlling presetable parameters of the respective functional unit.

It is generally known to monitor functional units at escalators and moving pavements, as for instance the driving motor of the stairs respectively the pallets or the hand-rail drive by means of safety devices. Often contactors are used which stop the escalator or the moving pavement in case of failure by means of electronics on the base of a firmly wired logic. Herein it has to be considered as a disadvantage that these electric components require a lot of space as well as an increased wiring.

According to the valid domestic and international safety regulations escalators and moving pavements have to be equipped in such a way that they are self-stopped before the speed exceeds for instance 1.2 times the nominal speed. Although this requirement is met by the known three monitoring devices on the base of contactors or their precontactors, the construction work is however considered as too extensive.

From U.S. Pat. No. 5,526,256 a control device for passenger conveyors has been known. A first as well as a second microcomputer are provided, the first microcomputer being in active relation via switches with safety elements which are responsible for starting the passenger conveyor. The results are used for initiating the passenger conveyor. The second microcomputer monitors the behaviour of the safety devices on the base of input signals of the same. In case of breakdown of one of the microcomputers the passenger conveyor is not stopped, but the second microcomputer takes the functions of the first one over, whereby important risks can rise during the continued operation of the passenger conveyor, since the failure has not been repaired, but only dislocated.

It is the aim of the subject of invention to provide a monitoring device for escalators and moving pavements, which corresponds to the actual technical possibilities and which, in comparison to the state of the art known in this field, offers on the one hand an essentially better price and on the other hand a better performance while being smaller in size. Furthermore the monitoring device shall be flexibly adaptable to different domestic and international safety standards. A stopping of the passenger conveyor shall be assured in any case when problems arise.

This aim is achieved according to the invention by the fact that the processors are independently from each other provided for simultaneously monitoring the driving motor of the stairs respectively the pallets and/or the driving motor of the hand-rail drive respectively drives and in particular for monitoring the speed(s) of the driving motor respectively motors, the processors being connected to safety contacts for immediately stopping the passenger conveyor, and that the processors are in active relation with at least one other processor, which is provided for the control and/or diagnosis of functional units not being relevant for safety.

Advantageous developments of the subject of invention are disclosed in the subclaims.

According to the domestic and international safety regulations, the principle of the monitoring device according to the invention is thus based on a mutual monitoring of the processors in case of need. This type of monitoring safety relevant functional units on the one hand and not safety relevant functional units on the other hand, which has not been realised for escalators and moving pavements as yet, corresponds to the actual state of the art and also meets the respective domestic and international safety standards, problems arising in the field of the functional units and/or the processors leading in any case to stopping the passenger conveyor.

Compared to the state of the art the constructional effort is substantially less. The monitoring device is flexibly adaptable to domestic and international safety regulations, the structural design regarding storage substantially remaining the same and, if necessary, individual possible functions—adapted to the respective standard—not being active.

According to the invention the processors serving for monitoring the safety relevant functional units are in active relation with at least one other processor, which may for instance be provided for control and/or failure diagnosis and may, in case of need, be located on the same board.

At least two microprocessors for monitoring the safety relevant functional units are used, which in particular control the speed of the respective functional unit (driving motor stairs/pallets/hand-rail drive). With two microprocessors a redundant monitoring of two speeds is carried out, while in case of need four microprocessors can be used for the speed monitoring of 2×2 speeds.

It can also be thought of a simultaneous monitoring of several mutually independent functional units of an escalator or a moving pavement, e.g. of the stairs or pallet band and the hand-rail drive by providing several microprocessors on the one and the same board.

A software intended for safety is used, by means of which the following parameters can inter alia be covered:

- Monitoring of transmission errors
- Detection of data overruns or data falsification
- Program pass monitoring
- Redundancy by means of cross comparison between the processors
- Parallel balance For a highest possible safety against intended software manipulations such a technology is used, by means of which modifications of the program or parts of the same are neither permissible nor feasible in the operating state of the functional unit.

Furthermore also a hardware intended for safety (fail-safe, i.e. always directed towards the safe state) is provided consisting of at least 2 processors corresponding to two channels (redundancy), in connection to a comparator channel via the software and control of the comparator.

A failure monitoring of the downstream safety relays and the data transfer between the processors can also be realised in a simple way.

The following parameters have to be monitored at functional units of escalators respectively moving pavements:

- speed
- temperature
- sensor monitoring
- underspeed
- overspeed
- reverse of running direction
- monitoring of parting of a cable The selection of the respective parameter(s) is up to the man skilled in the art.

At response of the monitoring device and stopping of the escalator respectively the moving pavement it shall furthermore be avoided that the escalator respectively the moving pavement can start again before a detailed inspection of the malfunction has been carried out by skilled personnel. Thus the software must provide for a turn-on locking during arising malfunctions, which can only be unlocked by the skilled personnel after the failure has been repaired.

For extension purposes also a so-called local peripheral bus may be provided.

The subject of invention is represented by means of an execution example in form of schematic diagrams and is described as follows. It is shown in FIG. 1 the control of an escalator with integrated motor controller FIG. 2 the control of a moving pavement with monitoring of the main drive of the pallets as well as the hand-rail drive FIG. 3 a redundant speed and hand-rail speed monitoring at an escalator FIG. 4 another alternative control of a moving pavement.

FIG. 1 shows a schematic diagram of a control of an escalator, which is not further represented here, with integrated motor controller, which shall fulfil the European standard.

The following components placed on a board A can be seen:

the driving motor 1 for the stairs of the escalator, microprocessors 2, 3 for the safety relevant speed monitoring of the driving motor 1, a further microprocessor 4 for control and diagnosis of not safety relevant escalator functions, e.g. of the preselection of the running direction, which microprocessor is in active relation to a serial interface 5 for a data exchange.

The dotted line shall only serve as an optical separation of the function monitoring (microprocessors 2, 3) and the diagnosis respectively control (microprocessor 4). For manufacturing and functional reasons all these components are placed on the same board A, but they are either only partially or completely taken into function according to the respective valid standard.

Optionally a local peripheral bus 6 can be provided for extension reasons. On the driving motor 1 mutually offset sensors 7,8 are mounted, which measure 2 times the rotational speed of the driving motor 1, for instance at its driven shaft, and convert it into corresponding digitally usable impulses, which are then supplied to the respective responsible microprocessor 2 respectively 3 via signal lines 9, 10.

The microprocessors 2, 3 are connected to each other via further data lines 11, so that a mutual monitoring is assured Thus, the microprocessors 2, 3 do not only check themselves on locally arising malfunctions, but also control whether the impulses, in this example speed impulses, supplied to the respective other microprocessor 3, 2 are within the tolerance range.

The reference numerals 12, 13 designate on the one hand the power supply of the so-called safety chain and on the other hand the power supply of the control itself. Via data line 14 the microprocessors 2,3 are in active relation with microprocessor 4 responsible for control and diagnosis.

In case of a malfunction in the region of the driving motor 1 contact 15, 16 of herein not further represented safety relays is actuated via microprocessor 2 respectively 3, which leads to the immediate stopping of the escalator. Furthermore optoelectronic coupler inputs 17 are provided, which are connected to contacts 18, 19, 20 of further safety elements 21, 22, 23, for instance emergency shutdown contacts.

Microprocessor 4 is furthermore in active relation with digital inputs 32 as well as digital outputs 33 for controlling functions, e.g. the one of energy saving.

Figure 2:
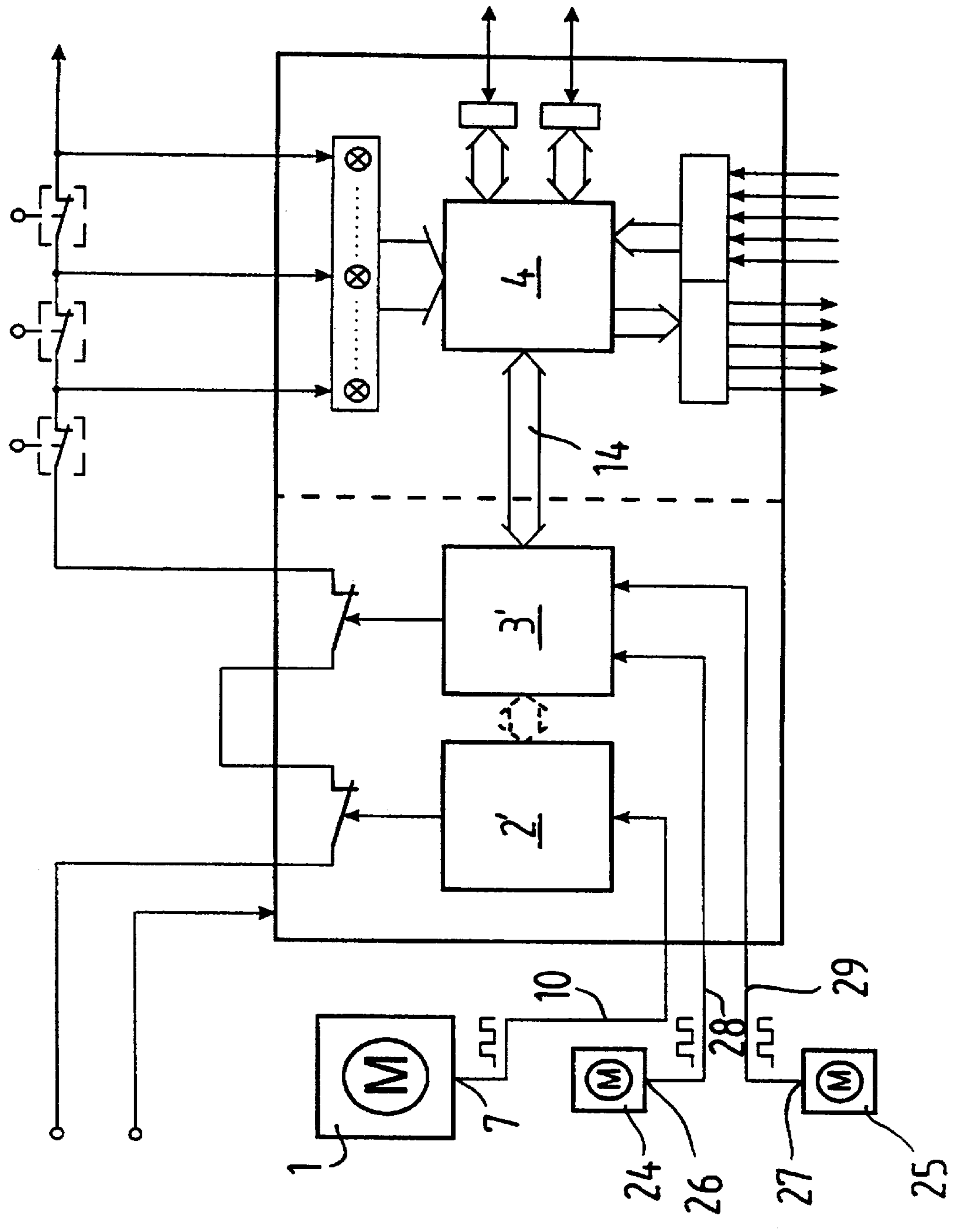

FIG. 2 is a block diagram also showing the control of a not further represented moving pavement, which shall fulfil the US standards (ANSI). Same components as in FIG. 1 are designated by the same reference numerals.

Driving motor 1 is represented in connection with only one sensor 7. For driving the hand-rail (not represented) two other electromotors 24, 25 are provided, on which also sensors 26, 27 are mounted. Via signal lines 10, 28, 29 the driving motors 1, 24, 25 are in active relation with two microprocessors 2', 3' for evaluating the safety relevant signals. Another microprocessor 4 is connected to the processors 2', 3' via data line 14. A mutual monitoring of the two microprocessors 2', 3' is not necessary here, since the US standards do not prescribe a redundancy at the moment. For manufacturing reasons this function is however provided—even if it shall not be used here—, since safety regulations are subject to permanent modifications. In this respect processor 3' can monitor other, also safety relevant functional units of the moving pavement, namely the hand-rail drive respectively drives 24, 25. The function of this control has to be considered as analogue to FIG. 1—with the exception of the extension—, the periphery also being identical.

Figure 3:
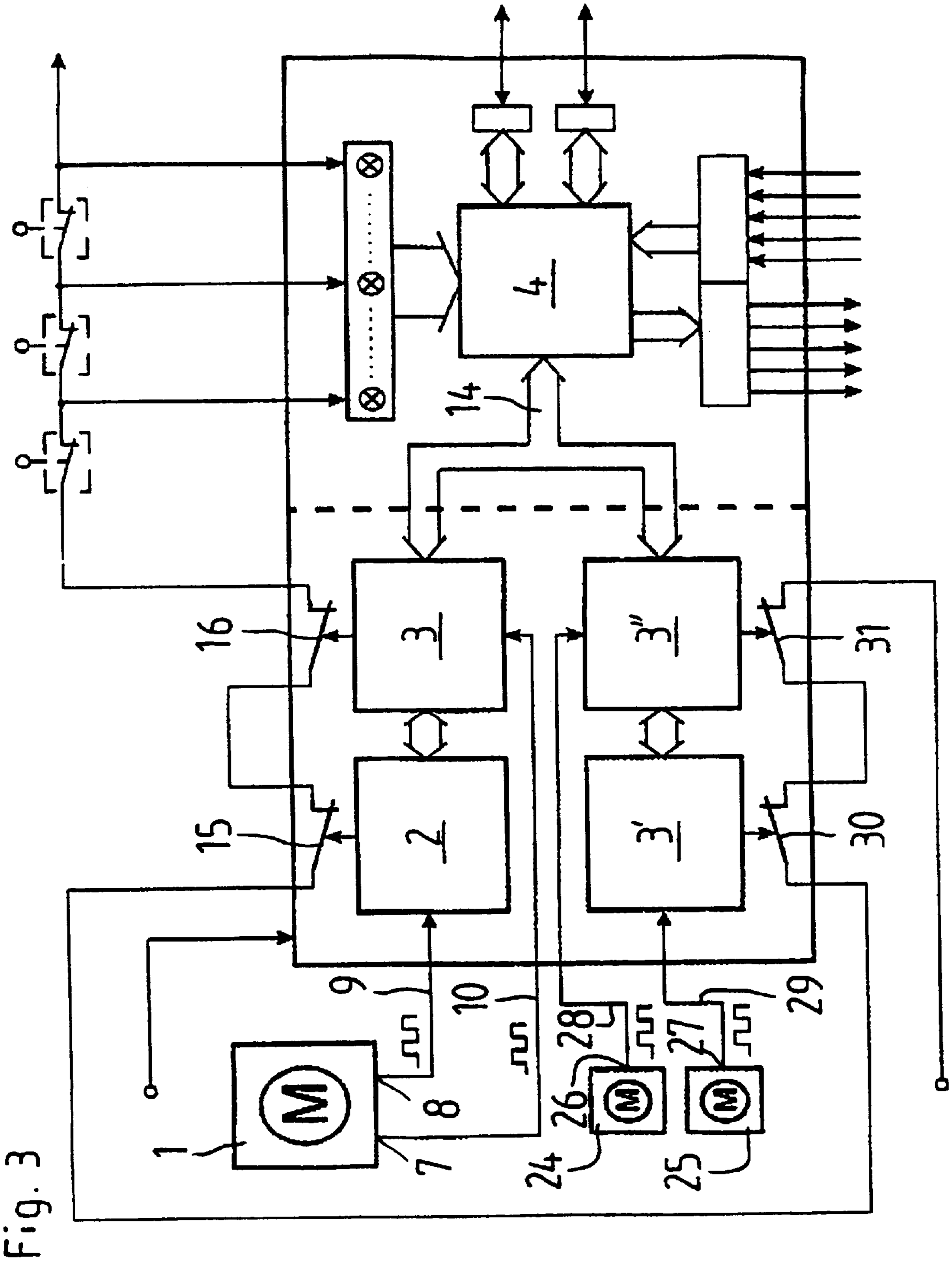

FIG. 3 shows another alternative control, which is a combination of FIGS. 1 and 2.

Analogue to FIG. 2 here should also be monitored the driving motor 1 of an escalator (not represented) on the one hand and the elctromotors 24, 25 of the hand-rails (not represented) on the other hand.

Respectively two microprocessors 2, 3 are provided for monitoring the driving motor 1 and two microprocessors 3', 3" for monitoring the elctromotors 24, 25. Via corresponding signal lines 9, 10, 28, 29 the sensors 7, 8, 26, 27 are connected to the respective processor. Via data lines 14 the processors 2, 3, 3', 3" are connected to the already mentioned microprocessor 4 for the not safety relevant control and diagnosis of the passenger conveyor. The periphery on this side has to be considered as analogue to FIGS. 1 and 2. Corresponding to FIG. 1, the microprocessors 2, 3 are connected to contacts, which in case of arising malfunctions cause an immediate stopping of the escalator.

The processors 3', 3" collaborate with equivalent contacts 30, 31, which in case of arising problems in the region of the hand-rail drives 24, 25 (for instance if a hand-rail breaks) cause an immediate stopping of the escalator.

Figure 4:
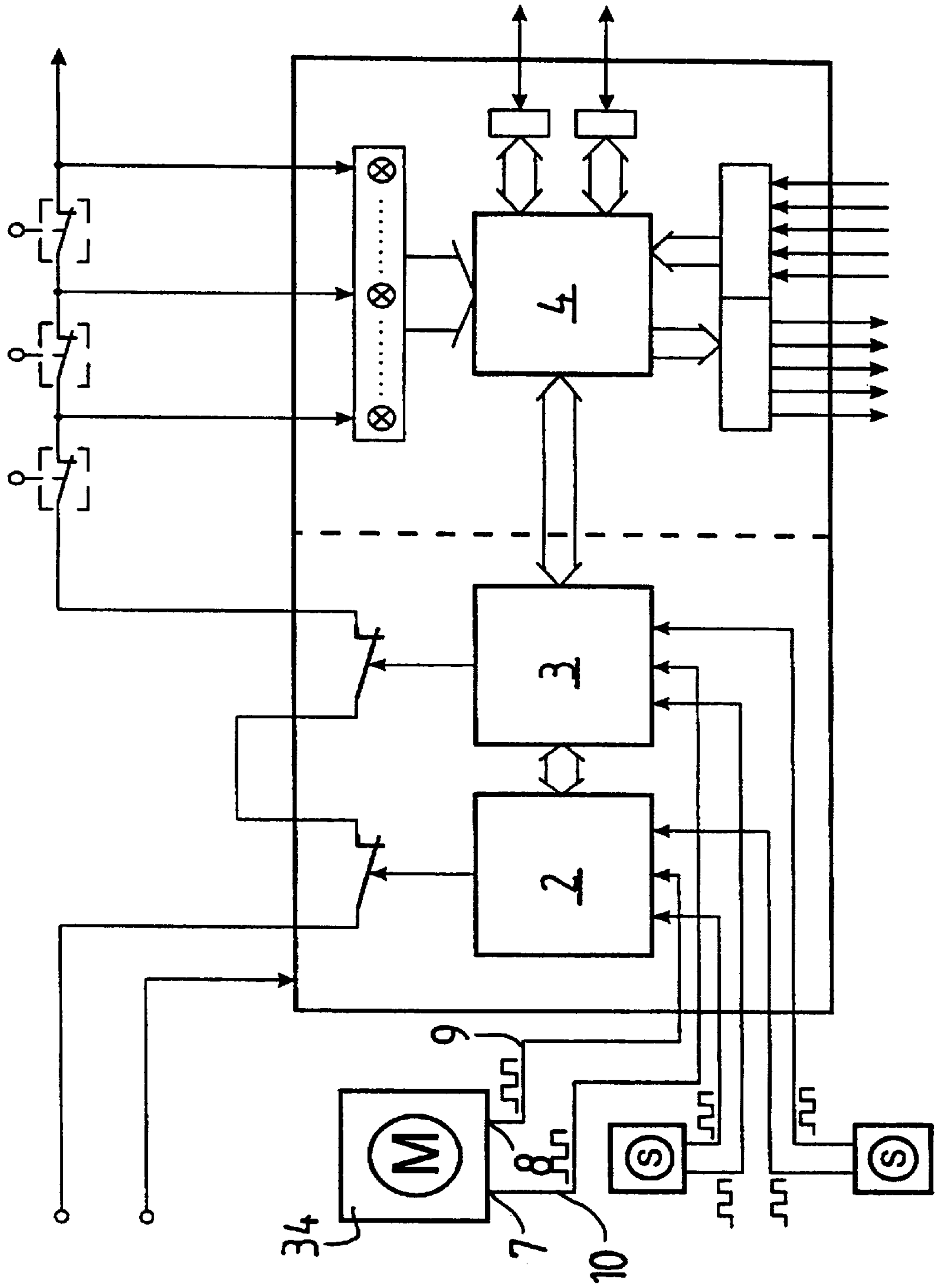

FIG. 4 shows another alternative control, for instance of a moving pavement.

While up to now only motors in active relation with sensors as monitoring elements have been represented, this example assumes a single driving motor 34, which drives both the pallet band (not represented) and the hand-rails via a not further represented mechanical calipering. For better clarity the same components are also here designated by the same reference numerals.

Further sensors are designated with S, which sensors are provided in the region of the mechanical calipering of the hand-rails and measure for instance the speeds thereof and supply these results as digital impulses via signal lines 35, 36, 37, 38 to the microprocessors 2, 3. In the region of the driving motor respectively one other sensor 7, 8 is placed, which is in active relation with the respective processor 2, 3 via an associated data line 9, 10. The processors 2, 3 monitor each other again in this example. The other components, such as in particular the other microprocessor 4, are in active relation with functions corresponding to the periphery thereof, which have already been described in the above examples.

What is claimed is:

1. Device for monitoring functional units at escalators and moving pavements consisting of several processors being independent from each other and controlling presetable parameters of the respective functional unit, characterized in that the processors (2, 3, 3', 3") are independently from each other provided for simultaneously monitoring the driving motor (1) of the stairs respectively the pallets and/or the driving motor (24, 25, 35) of the hand-rail drive respectively drives and in particular the speed(s) of the driving motor respectively motors (1, 24, 25, 35), the processors (2, 3, 3', 3") being connected to safety contacts (15, 16, 30, 31) for immediately stopping the escalator respectively the moving pavement, and that the processors (2, 3, 3', 3") are in active relation with at least one other processor (4), which is provided for the control and/or diagnosis of functional units not being relevant for safety.

2. Device according to claim 1, characterized in that each processor (2, 3, 3', 3") contains at least one component, the program of which cannot be modified in the operating state of the functional unit.

3. Device according to claim 1, characterized in that at least the mutually monitoring processors (2, 3, 3', 3") are provided on the same board (A).

4. Device according to claim 1, characterized in that the processors (2, 3, 3', 3") mutually exchange status information of the respective operating state of the functional units on the one hand and of the own state on the other hand within preselectable time intervals.

5. Device according to claim 1, characterized in that at least the mutually monitoring processors (2, 3, 3', 3") are provided locally, i.e. not in the region of the functional units, in particular of the driving motor (1, 24, 25, 34), to be monitored.

6. Device according to claim 1, characterized in that a processor (2') is provided for monitoring the driving motor (1) and another processor (3') is provided for monitoring the hand-rail drive (24, 25).

7. Device according to claim 1, characterized in that two processors (2, 3) are provided for monitoring the driving motor (1, 34) and two other processors (2, 3, 3', 3") are provided for monitoring the hand-rail drive (24, 25, S), and that the processors (2, 3 and 3', 3") monitor each other.

8. Device according to claim 1, characterized in that the further processor (4) is also placed on the same board (A) as the processors (2, 3, 3', 3") and is connected to the same via at least a data line (14), the processor (4) being in active relation with corresponding peripheral devices, such as digital inputs and outputs (32, 33) for controlling functions, serial interfaces (5) for data exchange and, if necessary, with at least one local peripheral bus (6) for extension possibilities.

* * * * *